US006612489B2

(12) United States Patent
McCormick et al.

(10) Patent No.: US 6,612,489 B2
(45) Date of Patent: Sep. 2, 2003

(54) SYSTEM FOR SECURED DELIVERY OF PACKAGES OR OTHER ITEMS

(75) Inventors: Mark McCormick, Grosse Ile, MI (US); Michael Garliauskas, Livonia, MI (US)

(73) Assignee: Deliverez, LLC., Grosse Ile, MI (US)

(*) Notice: Subject to any disclaimer, the term of this patent is extended or adjusted under 35 U.S.C. 154(b) by 181 days.

(21) Appl. No.: 09/773,378

(22) Filed: Jan. 31, 2001

(65) Prior Publication Data

US 2001/0045180 A1 Nov. 29, 2001

Related U.S. Application Data

(60) Provisional application No. 60/179,173, filed on Jan. 31, 2000.

(51) Int. Cl.[7] .................................................. G06K 5/00
(52) U.S. Cl. ...................................................... 235/382
(58) Field of Search ................................ 235/382, 383, 235/385; 232/19, 20, 21; 340/5.2, 5.23, 5.73

(56) References Cited

U.S. PATENT DOCUMENTS 2,023,826 A * 12/1935 Buskirk ....................... 232/42
4,609,780 A * 9/1986 Clark .................... 379/102.06
4,880,964 A * 11/1989 Donahue .................... 235/488
5,590,608 A * 1/1997 Yore et al. ..................... 109/50
5,774,053 A * 6/1998 Porter ..................... 340/568.1
5,979,750 A * 11/1999 Kindell ........................ 232/19
6,044,138 A * 3/2000 Graham et al. ........ 379/114.03
6,138,910 A * 10/2000 Madruga .................... 235/383
6,330,816 B1 * 12/2001 O'Connor ...................... 70/63
6,472,973 B1 * 10/2002 Harold et al. ............. 340/5.73

FOREIGN PATENT DOCUMENTS

WO WO 01/08078 A1 * 2/2001

* cited by examiner

*Primary Examiner*—Diane I. Lee
(74) *Attorney, Agent, or Firm*—John R. Benefiel

(57) ABSTRACT

A system for delivering an ordered item to a location where no one is available to receive the item, including a key locked storage box provided at the location in addition to a key receptacle at the location having a lock openable with a settable code. When delivery of an item is ordered, a code is assigned, and the code is printed on a label affixed to the item, a peel off security strip overlaid onto the assigned code imprint. The delivery person removes the strip when at the location and enters the code into the key receptacle lock to obtain the key necessary to open the box and place the item therein. A bar code strip in the box provides location data when scanned to enable verification of a successful delivery.

7 Claims, 3 Drawing Sheets

SYSTEM FOR SECURED DELIVERY OF PACKAGES OR OTHER ITEMS

CROSS REFERENCE TO RELATED APPLICATIONS

This application claims the benefit of provisional application Ser. No. 60/179,173, filed on Jan. 31, 2000.

BACKGROUND OF THE INVENTION

This invention concerns the secure delivery of packages to unattended locations, such as to homes where the residents are away at the time of the delivery.

There is currently a great need for an improved delivery system in a situation where a person is not available to receive the item at the time of the delivery. The great increase in the number of households where both husband and wife work out of the home, and the growing volume of E-commerce combine to increase this need. It is very costly for delivery companies to make return calls, and simply leaving packages on a porch or doorway invites theft and precludes verification of delivery.

Complex systems have heretofore been proposed to meet this need, as for example, the systems shown in U.S. Pat. No. 5,979,750, issued on Nov. 9, 1999 for a "Computerized Delivery Acceptance System" and U.S. Pat. No. 5,774,053, issued on Jun. 30, 1998 for a "Storage Device for the Delivery and Pickup of Goods".

In both instances, a complex computer control is envisioned which compares preset codes in an electronic memory with a code selectively input as by the use of a keyboard to control access to a receptacle.

Due to both cost and reliability concerns, a simpler system is desirable, which is both convenient, reliable, and secure.

It is an object of the present invention to provide a system for the secure delivery of packages and other items to an unattended location which is simple, yet convenient and secure.

Combination locks have been in use for controlling access to storage facilities but are not readily code settable. More recently, code settable key receptacles have been developed allowing access to a key for a door lock, allowing a service or delivery person who has been given a preset code to obtain access to a house or other building for some particular purpose, the code being conveniently resettable with new codes to prevent future access by use of a previously disclosed code. While this provides a simple and reliable solution for service access to a house, this does not solve the above described problems associated with package delivery.

SUMMARY OF THE INVENTION

The above objects, and others which will become apparent upon a reading of the following specification and claims, are achieved by providing a package receiving storage box readily accessible at the location to which a package is to be delivered. The box is equipped with a key lock, and the key is kept in a separate fixed receptacle which has a readily codeable lock, controlling access thereto.

When a package order is made to a shipper, a code is assigned, either by the purchaser or the company to whom the order is made. The purchaser sets this code into the key receptacle lock, after the order has been entered. In the meantime, the shipper causes the code to be printed on a package label and covered with a security seal, the labeled package then sent to a delivery company. When a delivery person having the package reaches the package destination, the delivery person peels off the seal to read the code, and enters the code into the key receptacle lock, obtaining the key. After unlocking and opening the storage box, the delivery person scans a bar code strip inside the box, generating electronic data as to the box location for package delivery tracking purposes, and deposits the package in the box, then closing and locking the same.

The key is returned to the receptacle, and a second bar code strip on the inside of the receptacle is scanned for verification of the return of the key.

The scanned data may be transmitted to the delivery company data bank for delivery status check and delivery verification.

The use of a separate key receptacle adapts the system to any storage facility and lock, which may be provided by a purchaser.

The simple key receptacle locked by a resettable lock is simple, low in cost, and reliable.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
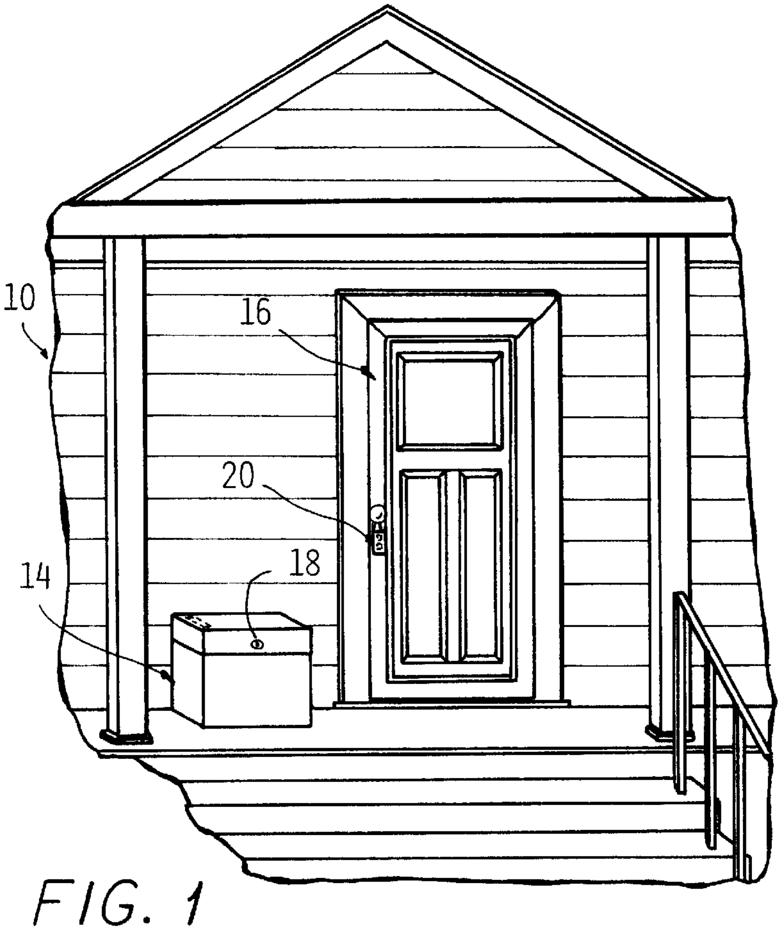
FIG. 1 is a fragmentary perspective view of a building porch and entrance door, with a storage box and key receptacle used in the present invention.
Figure 1A:
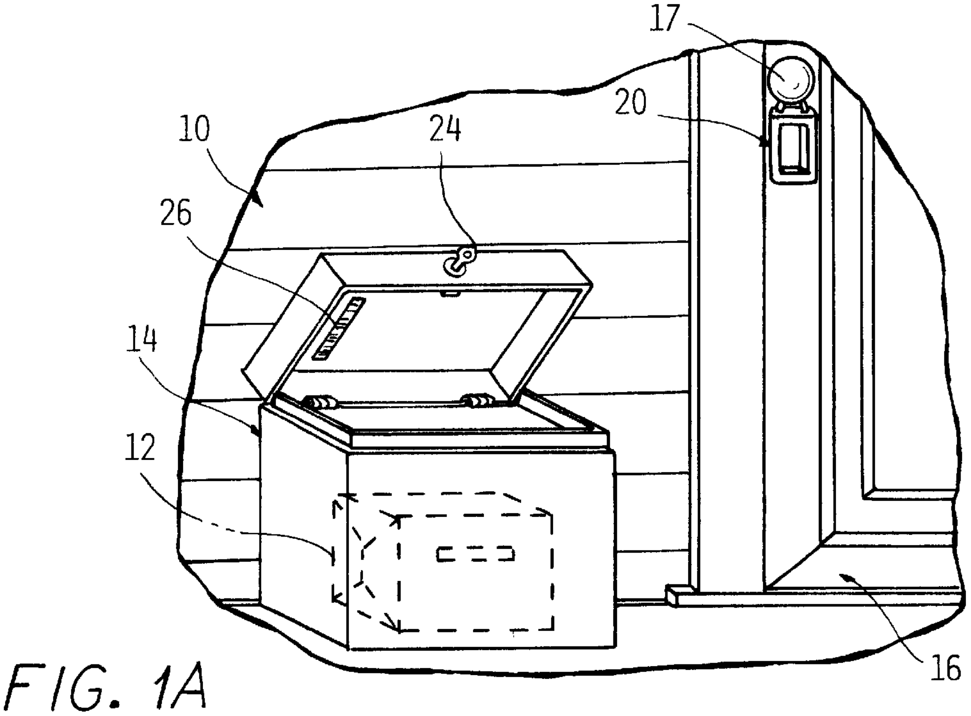
FIG. 1A is an enlarged perspective view of the building with the key receptacle and storage box shown in FIG. 1, the storage box opened to show a bar code strip affixed on the inside.
Figure 1B:
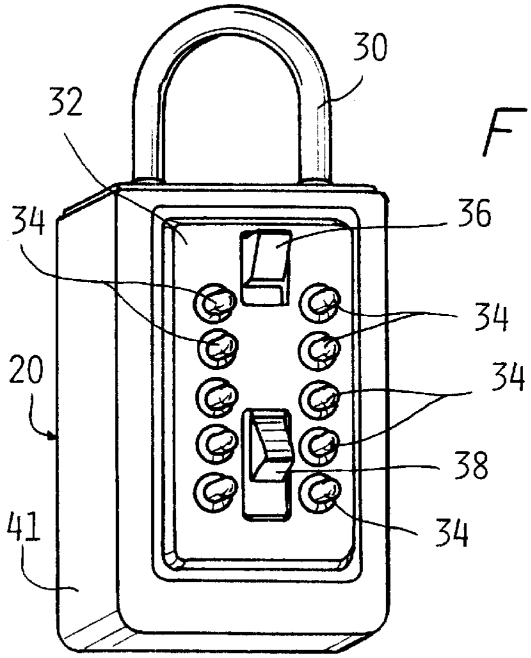
FIG. 1B is a further enlarged perspective view of the key receptacle shown in FIGS. 1 and 1A.
Figure 1C:
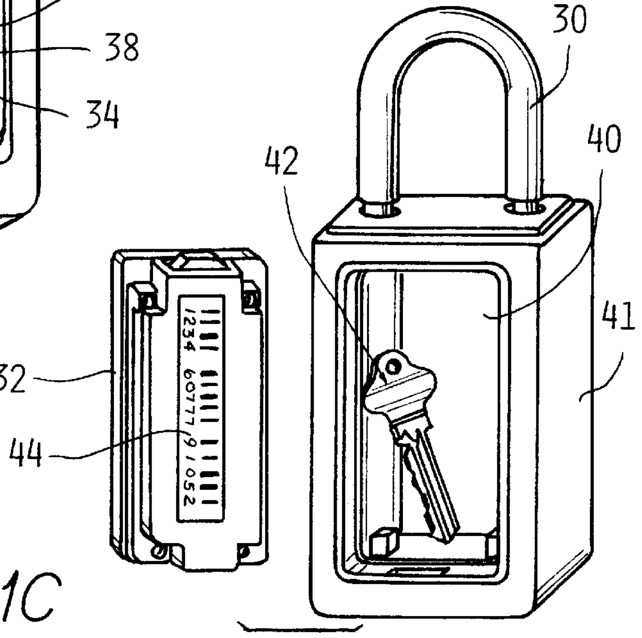
FIG. 1C is a perspective view of the key receptacle shown in FIG. 1B with the cover removed and rotated to show a bar code strip affixed thereon.

Referring to FIG. 1, a building 10 is shown to which a package 12 is to be delivered. A storage box 14 is located outside the building 10, shown adjacent an entrance door 16, equipped with a key lock 18. The storage box 14 would normally be anchored to the porch wall or floor to prevent removal. A key receptacle 20 is held to the building, as by being captured on the door knob 22 of the entrance door 16. The key receptacle 20 could alternatively be built in or bolted to the building 10 or secured in any other well known manner.

The storage box 14 key lock 18 may be opened with a key 24. A bar code strip 26 is affixed to the inside of the storage box 14, which when scanned generates data corresponding to the building location for use by the delivery company in verifying delivery.

The locking key receptacle 20 is of a commercially available type, which can be of several different types. Supra Products of Salem, Oreg. makes such receptacles suitable for this purpose. A U-shaped member 30 is at the top, which can be released upon opening of a cover 32 to be placed over a door knob 17 to capture the same. Other receptacle types are designed to be built in, bolted down, door hinge mounted, etc.

The cover 32 has a series of coding buttons 34 to encode a locking mechanism in the cover 32 which controls removal of the cover 32. A slide 36 is released when a code matching a preset code is entered by depressing selected keys 34 in the well known manner.

A reset slide 38 enables resetting of the selected code. A cavity 40 defined in a receptacle housing 41 is opened when the cover 32 is removed allowing removal of the key 24 for opening the storage box lock 14. A bar code strip 44 may be affixed to the inside of the cover 32 for scanned verification of the feet of replacement of the key 42. The preset code is set by rotating the buttons from the inside.

Figure 2:
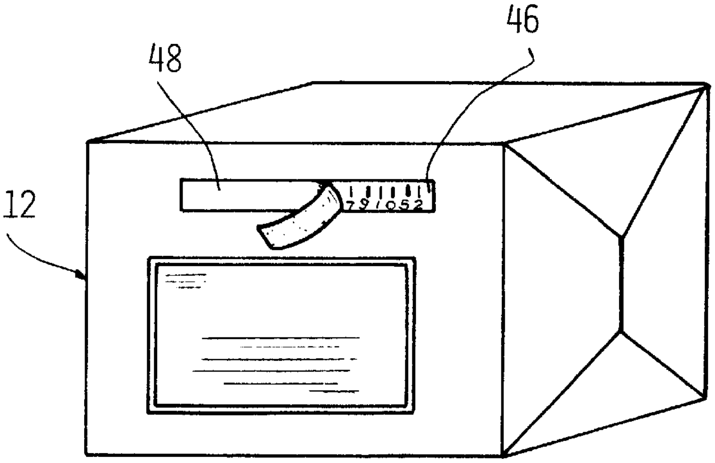
FIG. 2 is a perspective view of a package having a code imprint label and security seal affixed thereto.

Referring to FIG. 2, a label 46 is printed by the shipper which has the preset code imprinted thereon, covered by a peel-off removable security strip 48.

Key receptacles incorporating rotary combination or electronic locks may also be used.

Figure 3:
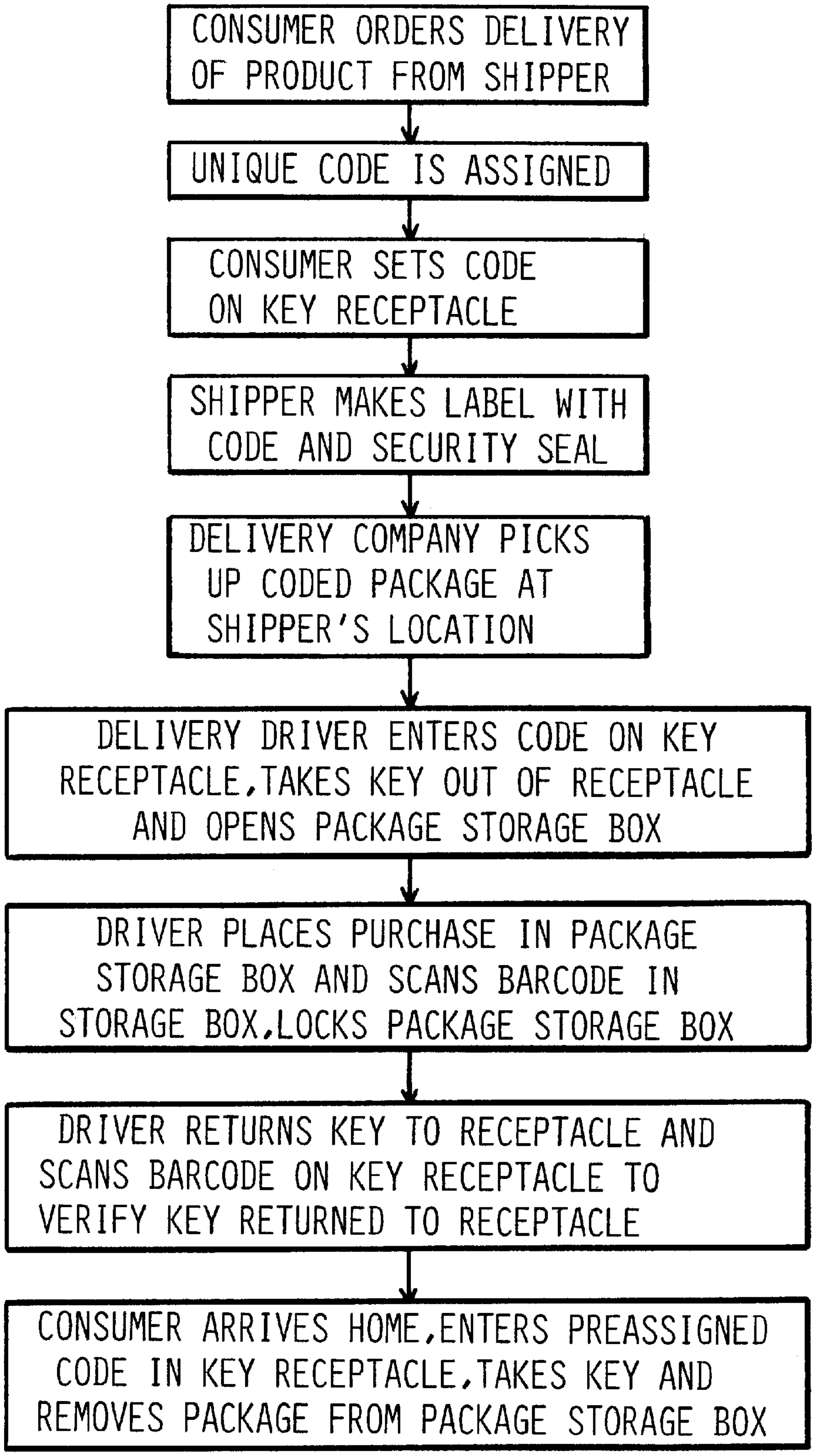
FIG. 3 is a block diagram flow chart setting out the steps of the delivery system process according to the present invention.

FIG. 3 sets out the steps of the system process according to the invention, which could be executed as a part of an on line transaction, but could also be used with more traditional transactions whenever delivery of packages is involved.

The process begins with a purchaser such as a consumer executes a purchase or other delivery order from a remote shipper, as via an on-line purchase from an e-company, designated as the shipper.

A unique code is assigned at that time, either by the shipper or the ordering party.

The consumer/orderer presets the assigned code into the key receptacle lock mechanism, and, if necessary for a receptacle which is not built in or otherwise anchored, secures the receptacle outside the building to which the package is to be delivered in a location prominently visible to a delivery person.

The shipper generates a label which has the assigned code printed thereon, overlain with the peel-off security seal, and places the label on the package.

The labeled package is then transferred to the delivery company, which then places the package in its normal system for delivery. Ultimately, the delivery person responsible for that delivery takes the package to the delivery location, peels off the security seal to read the assigned code, which is set into the key receptacle at that location.

After opening the key receptacle 20 and removing the key 24, the storage box 14 is unlocked and the package deposited therein.

Modern delivery companies equip their drivers with bar code scanners in order to aid tracking of deliveries, the scanned data transmitted in various ways to a computer data bank which is accessed to track deliveries.

The bar code 26 in the storage box 14 is thus scanned by the delivery person, which data corresponds to the delivery location, in order to verify, very reliably, that the package delivery has been made and has been made to the correct location.

The key 24 is then replaced in the key receptacle 20 and closed. The bar code strip 44 can be scanned to verify that the key 24 has been replaced in the receptacle 20.

After the consumer/orderer arrives at the delivery site, since he or she knows the assigned code, he or she can obtain the key 24 and access the storage box 14 to obtain the package.

Various deliveries can be arranged for a given day, which is made more secure since such key receptacles can be opened even if excess code numbers are entered, or the code numbers are entered in a different order, so that nominally different codes can be assigned.

What is claimed is:

1. A method of providing a secure delivery of an item to an unattended location pursuant to an order placed at a remote location from said unattended location, comprising the steps of:

providing a key locked storage box at said location;

providing a receptacle enclosing a key to said storage box lock at said location but outside said storage box, said key receptacle having a lock openable upon entry of a present unlock code;

assigning an unlock code for said key receptacle lock when a delivery order is placed;

presetting said key receptacle lock with said assigned code by a person having access to said key receptacle to preset said code at said location;

preparing an item label for said item bearing said assigned key receptacle unlock code;

transporting said item to said location;

entering said assigned code into said key receptacle lock and opening said key receptacle to obtain said key;

opening said storage box using said key and depositing said item to be delivered therein;

thereafter closing and locking said storage box; and, placing said key back in said key receptacle and thereafter closing and locking said key receptacle.

2. The method according to claim 1 further including the step of placing a peelable security strip over said item label, said strip being opaque to prevent viewing of said code.

3. The method according to claim 1 further including the step of fixing a bar code strip in said storage box, said bar code providing location data when scanned, and further including the step of scanning said bar code during the time said storage box is open to deposit said item.

4. The method according to claim 3 further including fixing a bar code in said key receptacle and scanning said bar code in said key receptacle when placing said key back in said receptacle.

5. The method according to claim 3 further including the step of transmitting said location data obtained by scanning said bar code to a delivery data bank for enabling verification from access to said delivery data bank of a delivery to said location.

6. The method according to claim 1 further including the step of providing a lock able to be mechanically presettable to allow code to be manually entered said preset for opening said key receptacle.

7. The method according to claim 1 further including the step of manually entering said unlock code in said key receptacle lock, and opening said key receptacle to obtain said key, and opening said storage box lock to enable removal of said item previously deposited.

* * * * *